United States Patent
Bhat et al.

(10) Patent No.: US 9,984,309 B2
(45) Date of Patent: *May 29, 2018

(54) CLASSIFYING AND GROUPING ELECTRONIC IMAGES

(71) Applicant: International Business Machines Corporation, Armonk, NY (US)

(72) Inventors: Mahesh P. Bhat, Houston, TX (US); Paul F. Gerver, Rochester, MN (US); Lennard G. Streat, Seneca Falls, NY (US); Cameron J. Young, Poland, OH (US)

(73) Assignee: International Business Machines Corporation, Armonk, NY (US)

( * ) Notice: Subject to any disclaimer, the term of this patent is extended or adjusted under 35 U.S.C. 154(b) by 61 days.

This patent is subject to a terminal disclaimer.

(21) Appl. No.: 14/871,332

(22) Filed: Sep. 30, 2015

(65) Prior Publication Data

US 2017/0091584 A1 Mar. 30, 2017

(51) Int. Cl.
*G06K 9/62* (2006.01)
*G06K 9/00* (2006.01)

(52) U.S. Cl.
CPC ....... *G06K 9/6215* (2013.01); *G06K 9/00536* (2013.01)

(58) Field of Classification Search
CPC .......... H04N 1/00132; H04N 1/00127; H04N 1/00143; H04N 2201/3205; H04N 1/00289; G06F 17/30265; G06F 17/30256; G06K 9/00288; G06K 9/00221; G06K 9/00536; G06K 9/6215; G07C 2011/02
See application file for complete search history.

(56) References Cited

U.S. PATENT DOCUMENTS

| 5,655,053 | A | * | 8/1997 | Renie | G11B 27/028 348/E5.058 |
| 6,526,158 | B1 | | 2/2003 | Goldberg | |
| 2002/0113879 | A1 | | 8/2002 | Battle et al. | |
| 2013/0051670 | A1 | * | 2/2013 | Das | G06F 17/30056 382/170 |

FOREIGN PATENT DOCUMENTS

EP  2146289     1/2010
WO  WO 2014060843 A2 *  4/2014  ......... G06K 9/00221

OTHER PUBLICATIONS

Manyam, Ohil Krishnarnurtyh, Two Faces Are Better Than One: Face Recognition in Group Photographs, University of California, San Diego, 2011, pp. 1-68.

(Continued)

*Primary Examiner* — Bhavesh Mehta
*Assistant Examiner* — Ian Lemieux
(74) *Attorney, Agent, or Firm* — VanLeeuwen & VanLeeuwen; Richard A. Wilhelm

(57) ABSTRACT

The embodiments relate to classifying and grouping images. Primary images and secondary images are created and stored. A preliminary relationship between the primary and secondary images is established. The primary image is compared with the secondary image to produce a relevance score. The relevance score is converted to a secondary image assignment, which includes selectively assigning the secondary image to a first group based on the relevance score.

17 Claims, 8 Drawing Sheets

(56) References Cited

OTHER PUBLICATIONS

"List of IBM Patents or Patent Applications Treated as Related," Letter from Leslie A. Van Leeuwen, Dec. 17, 2017, 1 page.
"Facial Recognition," Global Identity Management, 2014, 11 pages.
Wolf, "The New Totalitarianism of Surveillance Technology," The Guardian/UK, Aug. 17, 2012, 8 pages.
Bhat et al., "Classifying and Grouping Electronic Images," U.S. Appl. No. 15/844,591, filed Dec. 17, 2017, 48 pages.

* cited by examiner

CLASSIFYING AND GROUPING ELECTRONIC IMAGES

BACKGROUND

The embodiments described herein relate generally to image processing. More specifically, the embodiments described herein relate to classifying and grouping images based on detecting image characteristics.

Many people enjoy attending amusement parks, such as theme parks, water parks, etc. Patrons of these parks typically like to memorialize their experience by taking pictures of the sights and activities. One option for a patron is to take their own personal pictures around the park. However, taking personal pictures requires that the patron carry around a potentially expensive device that could get damaged or stolen. Furthermore, taking pictures with a personal device limits the types of pictures that can be captured. For example, taking pictures while on many types of rides is typically infeasible, if not expressly forbidden.

To address the desire for patrons to have photographs taken of their experiences while on a ride, many parks have installed camera systems designed to take pictures at one or more strategic points along the trajectories of various rides. For example, a camera may be situated around the bottom of a roller coaster hump to take a reaction shot of a patron screaming and shouting as she is plummeting toward the ground. These cameras are generally located a select rides, and the cameras that are present tend to be configured to only capture still images. The captured images are usually available for purchase at a gift shop or a kiosk located outside of the ride, and may either be printed on-site or sent to the patron via mail or e-mail. The images for sale tend to be rather expensive to purchase. At the same time, even if a patron is interested in purchasing a photograph as a souvenir, there are typically long lines or waits at the gift shop or kiosk. Accordingly, these negative externalities reduce the likelihood that a patron will be willing to purchase the photograph, which corresponds to a loss of revenue.

SUMMARY

The aspects described herein include a method, computer program product, and system for classifying and grouping images.

The aspects employ a method, system, and computer program product to manage digital images and video. Both primary and secondary images are captured by cameras. A primary image file is created and stored for the primary image, and a secondary image file is created and stored for the secondary image. A relevance score is produced from the comparison of the primary and secondary image files. This score is converted to an image assignment. More specifically, one or more secondary images are selectively assigned to a group with the primary image based on the relevance score conveying a match of the second and primary images. A match of the images is applied to a commercial purchase, with a selection of an image in the group file being changed to a transaction.

Other features and advantages of this invention will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not all embodiments, unless otherwise explicitly indicated.

DETAILED DESCRIPTION

It will be readily understood that the components of the embodiments described herein, as generally described and illustrated in the Figures herein, may be arranged and designed in a wide variety of different configurations. Thus, the following detailed description of the embodiments of the method, computer program product, and system, as presented in the Figures, is not intended to be limited, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments described herein will be best understood by reference to the drawings, wherein like parts are designated by like numerals throughout. The following description is intended only by way of example, and simply illustrates certain selected embodiments of devices, systems, and processes that are consistent with the claims herein.

The embodiments described herein below will make reference to amusement parks. An amusement park is a non-limiting example of a venue that may implement the embodiments described herein. It is to be understood that the embodiments described herein are not limited to the context of amusement parks, theme parks, water parks, etc., and it is to be appreciated that the embodiments described herein may be applied to any venue or location.

Figure 1:
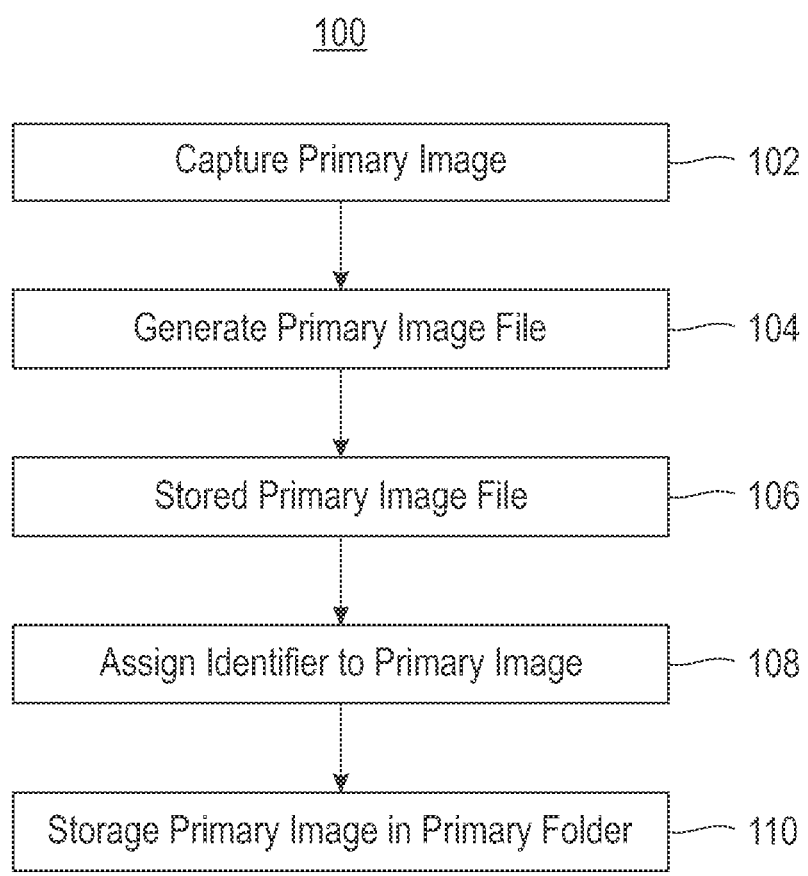
FIG. 1 depicts a flow chart illustrating a process for obtaining primary and secondary images, according to an embodiment.

FIG. 1 depicts a flow chart (100) illustrating a method for obtaining primary and secondary images. A primary image is captured (102), and an associated primary image file is generated (104). In one embodiment, the primary image is captured by a primary camera device that is placed, for example, at the entrance of the venue or location. The generated primary image file is then stored (106). The primary image file may be compressed using a compression format suitable for images, such as JPEG.

The primary image file may be stored on one or more computer readable storage devices, including but not limited to persistent storage and/or volatile storage. The stored primary image is assigned a unique identifier, $ID_P$ (108). $ID_P$ may be metadata associated with the primary image file. In one embodiment, $ID_P$ corresponds to a numerical ordering of the primary image. For example, $ID_P$ of the first primary image captured for the day may be assigned to "1," "0000001," etc., the next primary image captured for the day may be assigned to "2," "0000002," etc., and the fortieth primary image captured for the day may be assigned to "40," "0000040," etc. It is understood that the subject of the primary image is a patron or visitor in a specific venue. Accordingly, a captured primary image is assigned a unique identifier to facilitate finding the image at a later point in time.

It is understood that one or more secondary images are intended to be associated with at least one primary image, and in one embodiment, stored in a common location. As such, for each primary image, a primary image folder in an image database is created and initialized, and the primary image is stored in the image folder (110). In one embodiment, the image folder may also be referred to as a primary image group. Accordingly, a primary image of an individual is captured and stored prior to, or upon entrance, into a venue or location, and the primary image represents a foundational image of a respective primary image group.

As shown in FIG. 1, a primary image is captured by a primary camera device at a select location in a venue. One or more secondary camera devices may be placed at a variety of other locations throughout the venue, such as at points of interest or other high traffic areas. For example, in the context of an amusement park, the secondary cameras may be positioned outside of rides or attractions, on the rides or attractions themselves, at concession stands, at gift shops, or at any other point of interest. In one embodiment, each secondary image is captured by a respective secondary camera device. That is, each person at the venue or location may be associated with a plurality of secondary images. In order to prevent the flooding of data, the secondary camera devices may be configured to capture secondary images at select time intervals. For example, a first secondary camera may be configured to capture secondary images at a first set of intervals, and a second secondary camera may be configured to capture secondary images at a second set of intervals, with the first and second sets of intervals being different. Accordingly, one or more secondary images may be taken at various points of interest throughout a venue.

Figure 2:
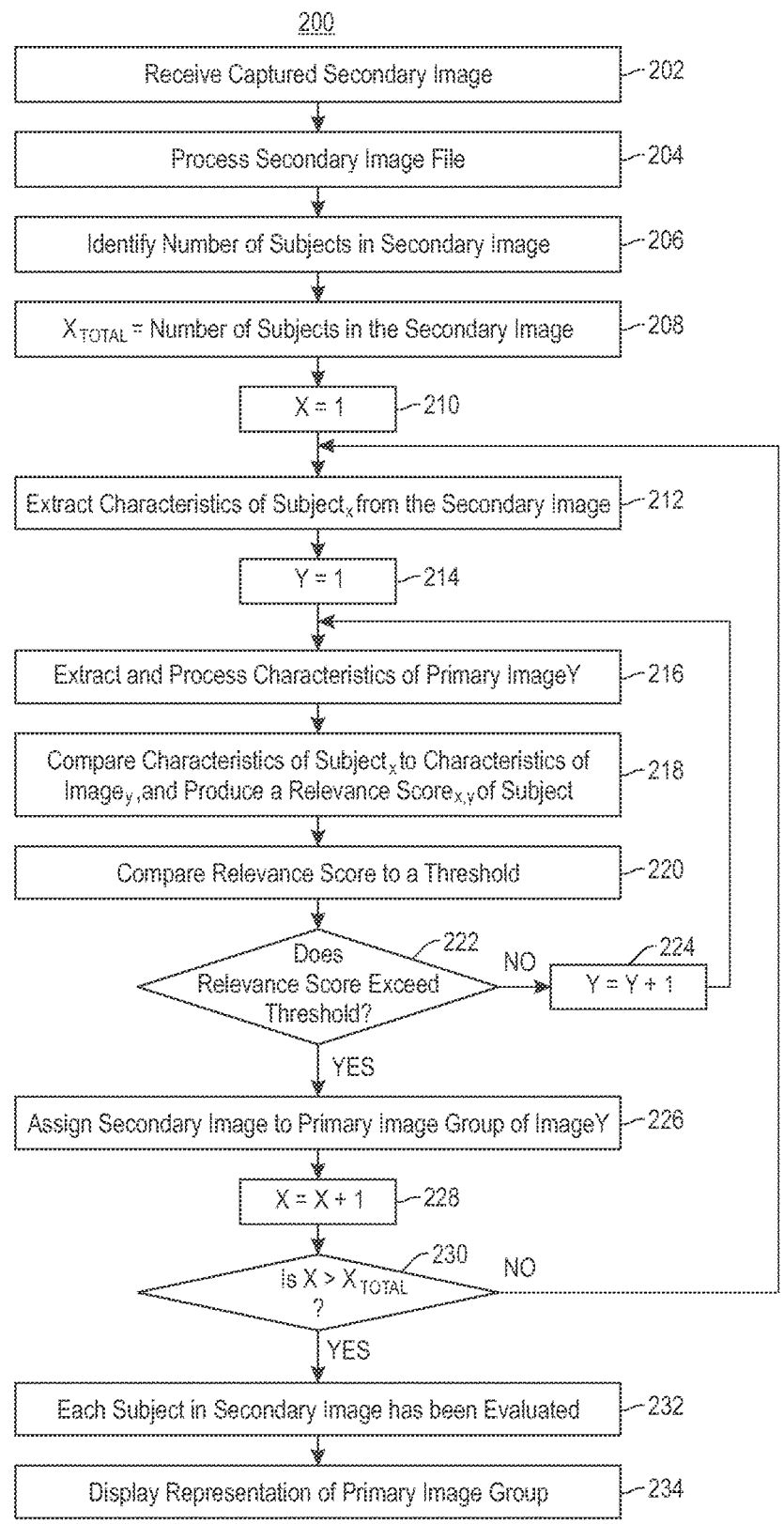
FIG. 2 depicts a flow chart illustrating a process for classifying a secondary image, according to an embodiment.

In one aspect, each received secondary image is classified and linked to a respective primary image. With reference to FIG. 2, a flow chart (200) is provided illustrating an exemplary process for classifying a secondary image. A captured secondary image file is received (202), which includes generating a secondary image file from the captured secondary image, and storing the secondary image file in a storage device. In one embodiment, the secondary image is captured by a secondary camera device. The secondary camera device is configured to capture still photographs featuring one or more people. In one embodiment, the secondary camera device is further configured to record video featuring one or more people. The video recording may be assigned to a secondary image that is captured along with the video recording, such that the video recording and secondary image are stored together. In one embodiment, the secondary image file is stored in a secondary image database. The secondary image file may be compressed using a compression format suitable for images, such as JPEG.

Upon receipt of the secondary image file at step (202), the secondary image file is sent for processing (204). The received secondary image file may depict a plurality of subjects, with each subject having respective one or more characteristics that are unique to the subject. In one embodiment, processing may include identification of at least one subject of the secondary image file to facilitate a targeted associated with at least one primary image. In one embodiment, some or all of the image data processing may occur on site using quickly deployable technology, such as field-programmable gate arrays (FPGAs).

The processing starts with identifying the number of subjects in the secondary image (206). It is understood that each image will have a minimum of one subject. In one embodiment, if the secondary image does not include the minimum number of subjects, the secondary image may be discarded. The variable $X_{TOTAL}$ is assigned to the number of subjects in the secondary image (208). For example, for a secondary image having three subjects, $X_{TOTAL}$ is set equal to three. A subject counting variable X is initialized (210). One or more characteristics of $subject_X$ are extracted and processed from the secondary image (212). In one embodiment, the one or more characteristics of $subject_X$ correspond to facial features of $subject_X$, including but not limited to hair color, eye color, skin color, etc. Depending on the algorithm used, the features may be automatically extracted, and in one embodiment they may be non-intuitive to us humans—as in deep convolutional neural networks or DBNs, etc. For instance, feature extractors today tend to do so hierarchically by first extracting edges, then, building upon these edges, they form higher-level features, which may not be as recognizable as hair color, eye color, etc.

The purpose of processing the characteristics of $subject_X$ is to find at least one primary image in the primary image database that corresponds to one of the subjects identified in the secondary image. A counting variable Y for each primary image is initialized (214). One or more characteristics from primary $image_Y$ of the primary image database are extracted and processed (216). In one embodiment, the variable Y is indexed to correspond to the particular unique identifier, $ID_P$, of the primary image. That is, $image_Y$ corresponds to the primary image file having $ID_P=Y$. It is understood that a comparison of characteristics should be based on a correspondence. In one embodiment, the subject of the extracted characteristics of the primary image directly corresponds to the subject of the secondary images. Specifically, if hair, eye, and skin color are extracted from the secondary image(s), hair, eye, and skin color are extracted from each primary image. Once the characteristics of the primary and secondary images are completed and available, the one or more characteristics of $subject_X$ are compared to the one or more characteristics of $image_Y$ to produce a relevance score of $subject_X$, $score_{X,Y}$ (218).

The relevance score is a metric used to quantify a relevance relationship between the subject of the secondary image and the primary image. In one embodiment, the relevance score may be less than a complete correspondence. For example, if four characteristics are compared three of which match, the score would be 75%. In one embodiment, the score may be employed at a later point in time as a confidence measurement, and to increase the likelihood of a match to the primary image. A variety of techniques and calculations for producing the relevance score are known in the art, and a person having skill in the art would know how to implement such techniques. With respect to relevance scoring, decaying probability may be applied to each individual to increase the likelihood of getting good matches. For instance, if a user walks in to the park, the strength of their probability could be some factor $T_{entry}$, and based upon statistics for how long people tend to be in the park, after say $T_{entry}+t_{avg\_expected}$ the factor that would multiply by all of their relevance calculations may start decreasing, thereby decreasing the likelihood that pictures after that point will be associated with them. This could also be used to prune out users from the relevance scoring process to speed up the calculation. In one embodiment, $T_{entry}$ could be equal to 1, and start decreasing after $T_{entry}+t_{avg\_expected}$ by some factor. This is also very practical in that in most social environments, individuals tend to move around more in the beginning of the event than at the end of it. For example, individuals in a waterpark are more active closer to the time that they arrive at the park, than at the end—at which point they are more likely to be sitting down eating, or sitting down in the lazy river.

In one embodiment, the relevance score is compared to a threshold (220). It is understood that the threshold represents a numerical likelihood of a match between the compared characteristics. In one embodiment, the threshold may be subject to change. Following step (220), it is determined if the relevance score exceeds the threshold (222). A negative response to the determination at step (220) indicates that the characteristics of subject$_X$ are an insufficient match to the characteristics of image$_Y$, and it is likely that the primary and secondary images under evaluation do not match. The counting variable Y is increased (224), and the process reverts back to step (216). An affirmative response to the determination at step (222) indicates that the characteristics of subject$_X$ are a sufficient match to the characteristics of image$_Y$, and the secondary image file is assigned to the primary image group of image$_Y$ (226). In one embodiment, the assignment of the secondary image file to the primary image group includes linking the secondary image file to the primary image file. The counting variable X is increased (228), and it is determined if there are additional subjects in the secondary image that have not been evaluated with respect to a primary image (230). A negative response to step (230) is followed by a return to step (212), and an affirmative negative response to step (230) means that each subject in the secondary image has been evaluated (232), and in one embodiment assigned to a respective primary group.

Steps (202)-(230) as described above may be performed by image recognition algorithms and/or software, such as facial recognition algorithms and/or software. Examples of such software are known in the art, and details with respect to the implementation of image processing and/or image recognition software will not be provided herein.

In one embodiment, a representation of a primary image group may be displayed or viewed (234). For example, the primary image group may be displayed on a visual display device located near the exit of the venue. This allows a patron to view the collection of images assigned to the patron's primary image group, prior to choosing whether or not to purchase one or more of the images. In one embodiment, the patron has the option of purchasing individual images of the primary image group, a subgroup of the primary image group, or the entire primary image group. The images that are purchased may be printed out on site, or may be sent to the patron via e-mail, regular mail, etc. Accordingly, the method described above in the context of FIGS. 1 and 2 allows for the autonomous capture and association of images and video, thereby enabling a patron to purchase one or more photographs or videos at a single location.

Figure 3:
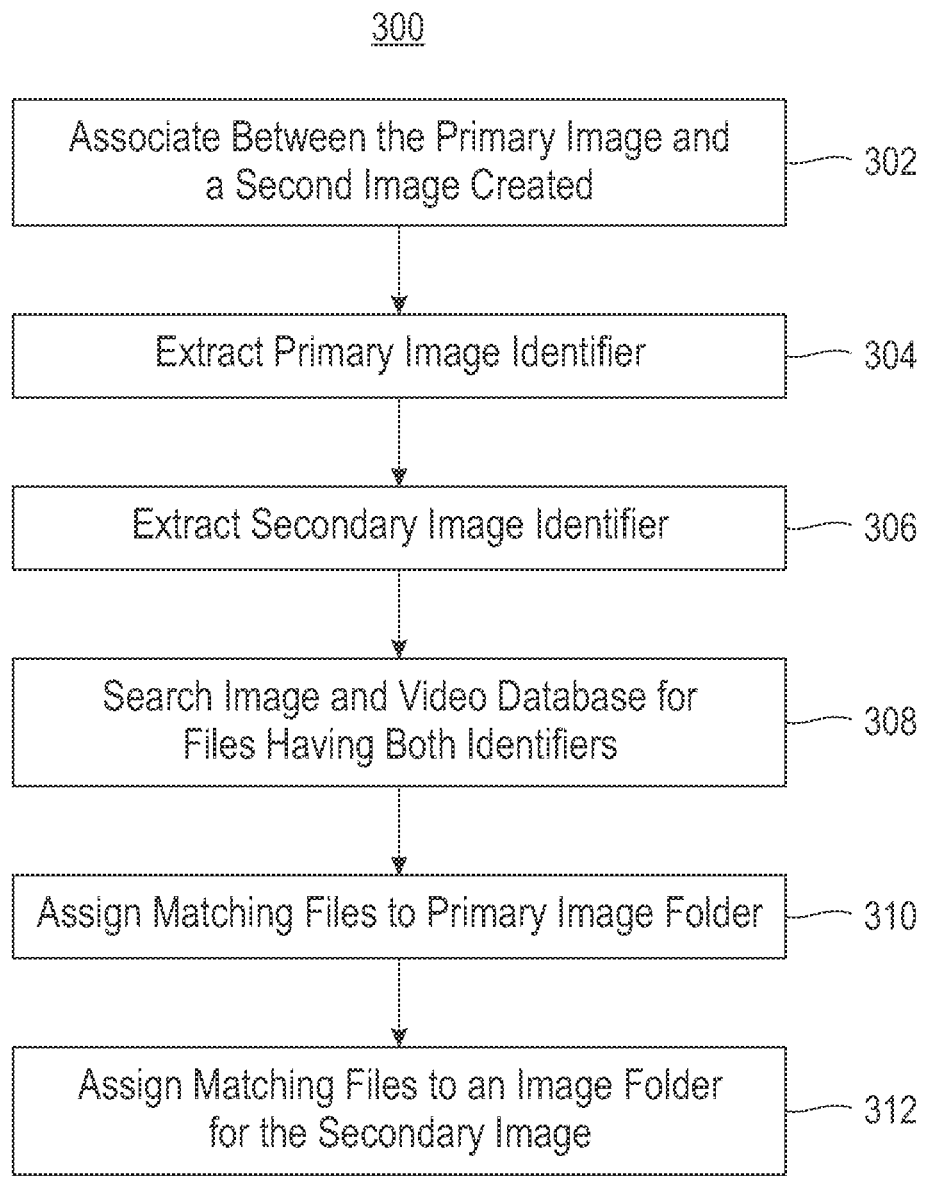
FIG. 3 depicts a flow chart illustrating a process for dynamically adding images and video to the folder, according to an embodiment.

The method of FIGS. 1 and 2 is focused on grouping pictures based upon analyzing the characteristics of image subjects. It is understood that an individual may be a part of a larger group of people. Different algorithms may be invoked to assign images to a primary image folder. Referring to FIG. 3, a flow chart (300) is provided illustrating a process for dynamically adding images and video to the folder. As shown and described in FIGS. 1 and 2, an association between the primary image and at least one secondary image is created (302). From this association, the primary image identifier is extracted (304), and a secondary image identifier is extracted for a secondary subject determined or considered to be associated with the primary image (306). With these extracted identifiers, the image and video databases are searched for any images and/or video that contains both of these identifiers (308). Any images and/or video that match are assigned to the primary image folder (310). In one embodiment, the matching images and/or video area also assigned to an image folder for the secondary image (312). Accordingly, the process shown herein populates the folders of the identifiers ascertained to have a relationship.

The process of populating the individual folders should not be limited to that shown and described herein. Other grouping algorithms may be employed. For example, in one embodiment, a clustering algorithm may be used to track faces of patrons in images, and then any images with the same combination of associated identifiers may be placed in the image folder of each of the identified patrons. Similarly, a threshold of likelihood of a match may be lowered to increase the number of images placed in the folder, or raised to lower the number of images placed in the folder. In one embodiment, the threshold level is present, and an associated threshold value may be modified. In addition, the population of the folder may be updated dynamically, or at discrete time intervals.

Figure 4:
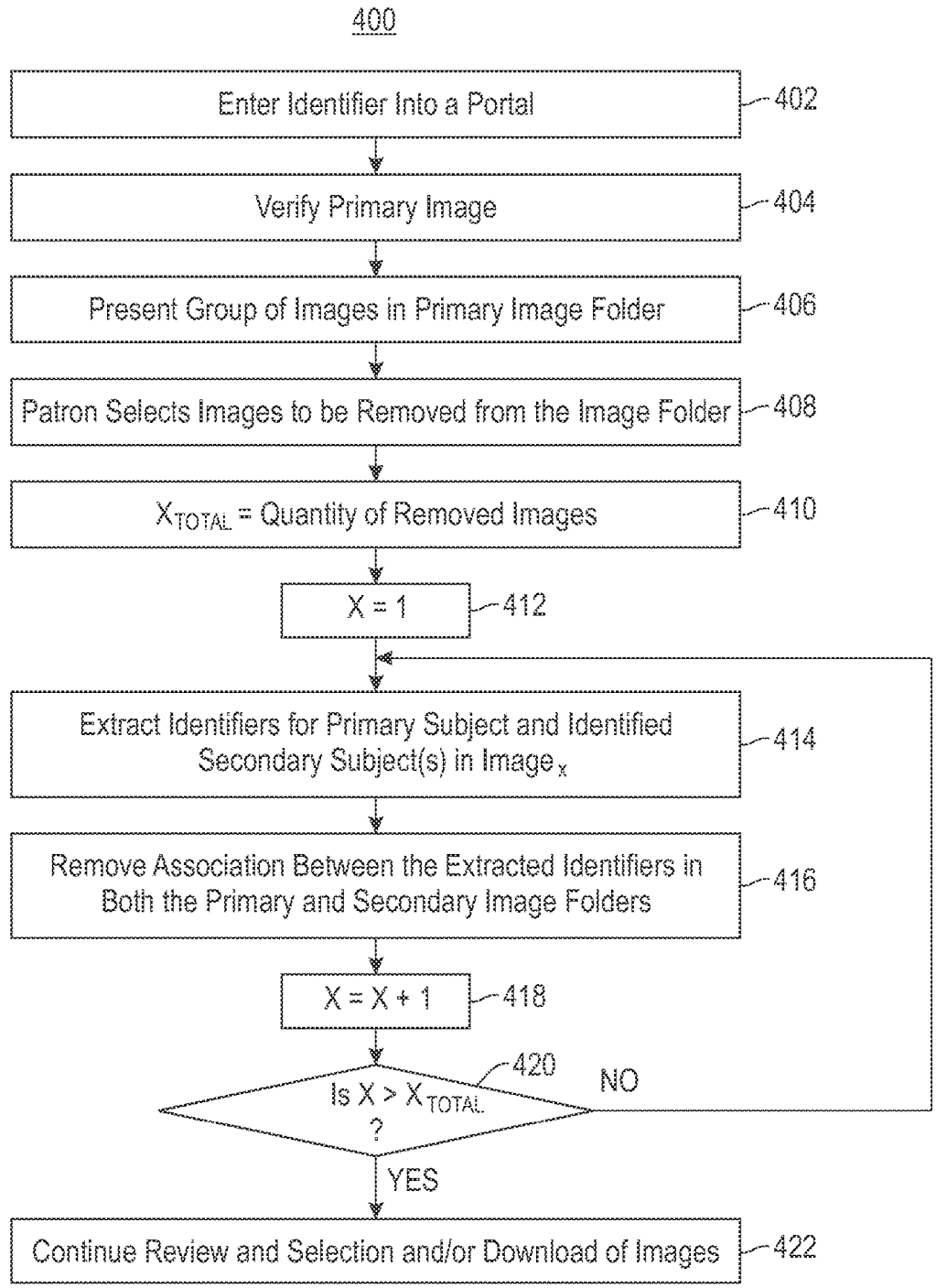
FIG. 4 depicts a flow chart illustrating a process for reviewing the generated associations, according to an embodiment.

Referring to FIG. 4, a flow chart (400) is provided illustrating a process for reviewing the generated associations. The reviewing process is shown to occur as a patron is exiting the venue. In one embodiment, the viewing may occur while the patron is at the venue, or in another embodiment the patron may remotely participate in the review process through connection to a shared resource, i.e. cloud computing. As shown, the patron enters an identifier into a portal (402). The identifier may be a ticket the patron received upon entrance to the venue. The primary image associated with the identifier is presented to the patron for verification (404), and an image or a group of images assigned to the folder associated with the identifier are presented to the patron (406). In one embodiment, the images are presented on a visual display. The patron may contribute to the association process. As shown herein, the patron may select any image in the folder that is not relevant, e.g. does not belong, for removal from the patron's folder (408). In one embodiment, the patron may invoke inverse logic for the selection process. Similarly, in one embodiment, all of the pictures may be considered relevant. An image selected at step (408) for removal may feature multiple patrons, and it may be important to note the specific patron depicted being correlated to the patron who is removing the image. In such a scenario, the removal at step (408) may include identifying which patron in the image is being rejected. In one embodiment, this identification prevents the image from being assigned to the patron's folder again in the future.

Step (408) may further include an autonomous reassignment of the removed image to a folder of another patron. In one embodiment, an image is reassigned to the folder of a patron having the next highest relevance score exceeding the threshold. For the sake of illustration, say an image was correlated with four patrons, $Patron_A$, $Patron_B$, $Patron_C$, and $Patron_D$. It was previously determined that for a threshold relevance value set at 65%, $Patron_A$ has a relevance score of 80%, $Patron_B$ has a relevance score of 78%, $Patron_C$ has a relevance score of 70%, and $Patron_D$ has a relevance score of 50%. Since it was initially determined that $Patron_A$ has the highest relevance score, the image was initially assigned to the folder of $Patron_A$. If $Patron_A$ flags or otherwise identifies the image as irrelevant, the image will be automatically reassigned to the folder of $Patron_B$. Similarly, if $Patron_B$ then flags or otherwise identifies the image for removal, the image will be automatically reassigned to the folder of $Patron_C$. However, if $Patron_C$ flags the image for removal, the image will not be automatically reassigned to $Patron_D$ because the relevance score of 50% is less than the 65% threshold relevance value. In one embodiment, the image may be deleted or otherwise permanently discarded if there are no patrons having a sufficiently high relevance score remaining.

Accordingly, the first part of the process shown herein is for the filter to review and parse through the images and video assigned to their folder.

Following the selection process at step (408), the quantity of images removed from the folder is assigned to the variable $X_{Total}$ (410), and an associated counting variable, X, is initialized (412). The identifier for both the primary subject and the identified secondary subject in the $image_X$ are extracted (414). In one embodiment, the images being removed have been determined to have a relationship upon patrons that does not exist. The association of the images is removed. In one embodiment, the image database is searched for all images that contain the identifiers of both the primary subject and the secondary subject to remove the created association in both the image folders of the primary and secondary images (416). Following step (416), the image counting variable is incremented (418) and it is determined if all of the images subject to discard have been removed (420). If any images for review remain, the process returns to step (414). Once the review of all of the removed images is completed, the process continues with the primary patron reviewing the remaining images and video and selecting any one of the images or video for purchase or download (422). In one embodiment, a watermark may be used in pictures to prevent users from taking screenshots of pictures to avoid paying. It is understood that the actions of one patron may affect the image presentation of other patrons. In one embodiment, the removal of images from a patron's folder may be limited to their folder and may not affect the population of another patron's folder. This would provide a limited removal so that the actions of one patron are limited to that patron, and would enable the secondary subject to determine relevance or interest in the image of video when reviewing their image group folder in their portal.

Figure 5:
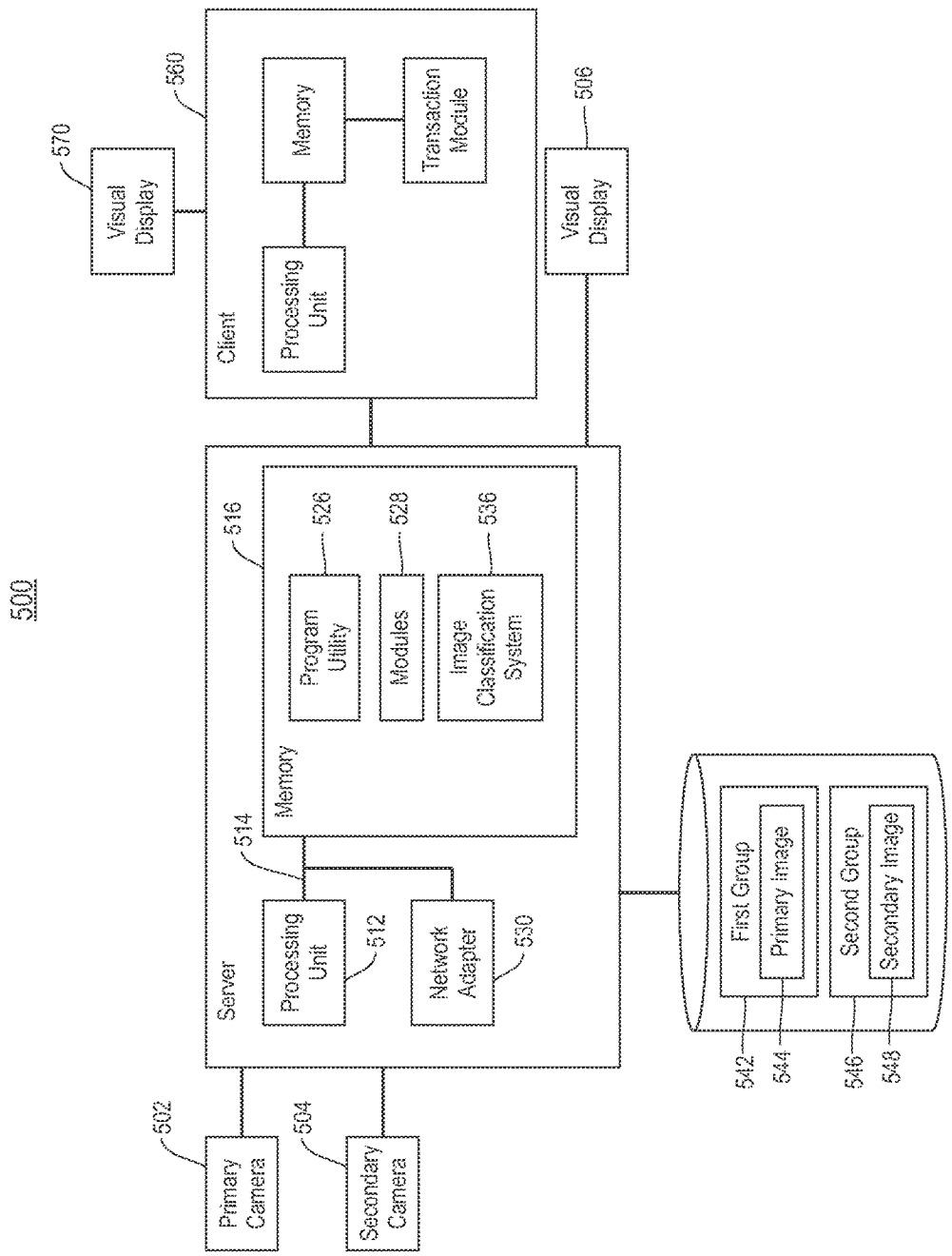
FIG. 5 depicts a block diagram of a computer system to support image processing and to perform the processes depicted in FIGS. 1-4, according to an embodiment.

With reference to FIG. 5, a block diagram (500) is provided illustrating an example of a computer system/server (502) with tools to support image classification for implementing the process described in the context of FIGS. 1-4. The image classification system is operational with numerous other general purpose or special purpose computing system environments or configurations. Examples of well-known computing systems, environments, and/or configurations that may be suitable for use with the image classification system include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The image classification system may be described in the general context of computer system-executable instructions, such as program modules, being executed by a computer system. Generally, program modules may include routines, programs, objects, components, logic, data structures, and so on that perform particular tasks or implement particular abstract data types. The image classification system may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, the image classification system is implemented in the form of a general-purpose computing device. The components of the image classification system may include, but are not limited to, a server (510) configured with one or more processors or processing units (512), system memory (516), and a bus (514) that couples various system components including system memory (516) to processor (514). Bus (514) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. The image classification system typically includes a variety of computer system readable media. Such media may be any available media that is accessible by the image classification system and it includes both volatile and non-volatile media, removable and non-removable media.

Memory (516) can include computer system readable media in the form of volatile memory, such as random access memory (RAM) and/or cache memory. The image classification system further includes other removable/non-removable, volatile/non-volatile computer system storage media. By way of example only, storage system (540) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (514) by one or more data media interfaces. As will be further depicted and described below, memory (516) may include at least one program product having a set (e.g., at least one) of program modules that are configured to carry out the functions of the embodiments described herein.

Program/utility (526), having a set (at least one) of program modules (528), may be stored in memory (516) by way of example, and not limitation, as well as an operating system, one or more application programs, other program modules, and program data. Each of the operating systems, one or more application programs, other program modules, and program data or some combination thereof, may include an implementation of a networking environment. Program modules (528) generally carry out the functions and/or methodologies of embodiments as described herein. For example, the set of program modules (528) may include at least one module that is configured to compare the primary image (544) with one or more characteristics of the secondary image (548) to produce a relevance score of the secondary image, and to convert the relevance score to an assignment of the secondary image by selectively assigning the secondary image to a primary image group (542) based on the relevance score. The primary image group (542) is shown herein stored on persistent storage device (540), although in one embodiment, the image group (542) may be stored in one or more components of memory (516).

The image classification system (530) is shown herein embedded in memory (516). The image classification system (530) is configured to communicate with one or more external devices, including but not limited to a primary camera (502), a secondary camera (504), and visual display (506). The primary camera (502) is configured to capture the primary image (544), and the secondary camera (504) is configured to capture respective secondary image(s) (548). The primary camera device (502) and the secondary camera (504) are in communication with memory (516) and, upon capture, the primary and secondary images (544) and (548) are stored in one or more components of memory (516) for processing, and in one embodiment stored in persistent storage (540). Visual display (506) may be configured to display a representation of an image group, such as primary image group (542) that includes the primary image (544) and each secondary image (548) that is determined to be sufficiently relevant to the primary image. For example, any secondary image linked to the primary image (544) may be communicated to the visual display (506) associated with a request to view images in the first group (542).

The image classification system (536) may also communicate with one or more devices (560) that enable a user to interact with the image classification system and/or any devices (e.g., network card, modem, etc.) that enable the image classification system to communicate with one or more other computing devices. Such communication can occur via Input/Output (I/O) interface(s). Still yet, the image classification system (536) can communicate with one or more networks such as a local area network (LAN), a general wide area network (WAN), and/or a public network (e.g., the Internet) via network adapter (530). As depicted, network adapter (530) communicates with the other components of the image classification system (536) via bus (514). In one embodiment, the primary and secondary images (544) and (548) may be received by the server (510) from the primary and secondary cameras (502) and (504), respectively, and communicated by the network adapter (530) to memory (516) via bus (514) for storage. It should be understood that although not shown, other hardware and/or software components could be used in conjunction with the image classification system (402). Examples, include, but are not limited to: microcode, device drivers, redundant processing units, external disk drive arrays, RAID systems, tape drives, and data archival storage systems, etc.

As shown herein, the images may be presented on a visual display (506), which is shown in communication with the server (510). In one embodiment, the image classification system is accessed via a portal as supported by a client machine (560). The client machine (560) is shown herein with a processing unit (562) in communication with memory (566) across bus (564). The client machine (560) is shown with a transaction module (570) in communication with memory (566). In one embodiment, the transaction module (570) is located on the server (510) and is accessed by the client machine (570) via the network adapter (530). The transaction module (570) converts the image assignments, classification into groups, and associated relevance scores, into an interface to support a commercial transaction for purchase of selective image files.

The process shown in FIGS. 1-4 and the computer system shown in FIG. 5, may be incorporated into a cloud based system that supports local and remote image management in a shared resource environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 6:
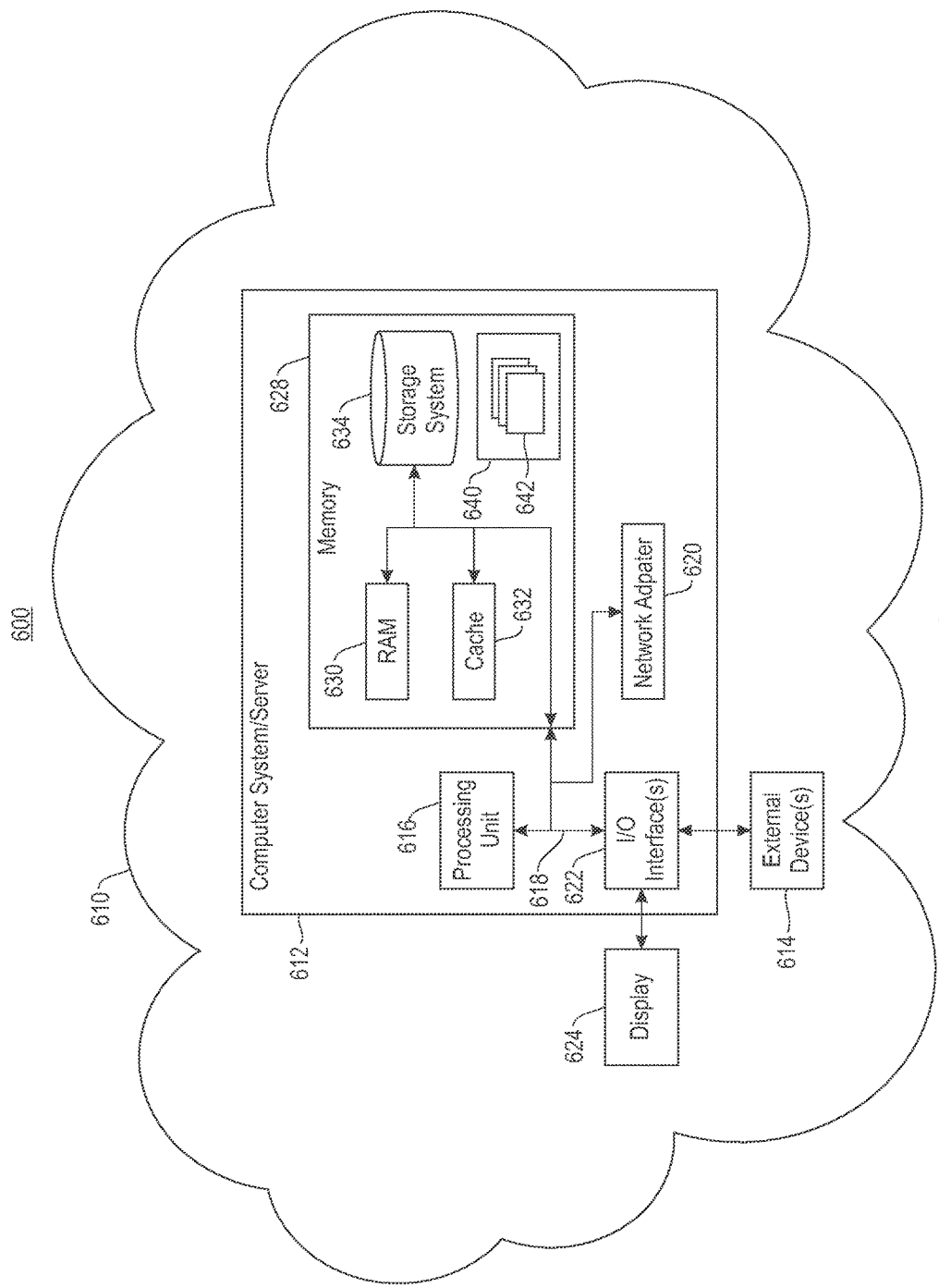
FIG. 6 depicts a schematic example of a cloud computing node.

Referring now to FIG. 6, a schematic of an example of a cloud computing node (600) is shown. Cloud computing node (610) is only one example of a suitable cloud computing node and is not intended to suggest any limitation as to the scope of use or functionality of the embodiments described herein. Regardless, the cloud computing node is capable of being implemented and/or performing any of the functionality set forth hereinabove.

In cloud computing node (610) there is a computer system/server (612), which is operational with numerous other general purpose or special purpose computing system environments or configurations. Examples of well-known computing systems, environments, and/or configurations that may be suitable for use with computer system/server (612) include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server (612) may be described in the general context of computer system executable instructions, such as program modules, being executed by a computer system. Generally, program modules may include routines, programs, objects, components, logic, data structures, and so on that perform particular tasks or implement particular abstract data types. Computer system/server (612) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server (612) in cloud computing node (610) is shown in the form of a general-purpose computing device. The components of computer system/server (612) may include, but are not limited to, one or more processors or processing units (616), a system memory (628), and a bus (618) that couples various system components, including system memory (628) to processor (616).

Bus (618) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server (612) typically includes a variety of computer system readable media. Such media may be any available media that is accessible by computer system/server (612), and it includes both volatile and non-volatile media, removable and non-removable media.

System memory (628) can include computer system readable media in the form of volatile memory, such as random access memory (RAM) (630) and/or cache memory (632). Computer system/server (612) may further include other removable/non-removable, volatile/non-volatile computer system storage media. By way of example only, storage system (634) can be provided for reading from and writing to a non-removable, non-volatile magnetic media (not shown and typically called a "hard drive"). Although not shown, a magnetic disk drive for reading from and writing to a removable, non-volatile magnetic disk (e.g. a "floppy disk"), and an optical disk drive for reading from or writing to a removable, non-volatile optical disk such as a CD-ROM, DVD-ROM or other optical media can be provided. In such instances, each can be connected to bus (618) by one or more data media interfaces. As will be further depicted and described below, memory (628) may include at least one program product having a set (e.g., at least one) of program modules that are configured to carry out the functions of embodiments.

Program/utility (640), having a set (at least one) of program modules (642), may be stored in memory (628) by way of example, and not limitation, as well as an operating system, one or more application programs, other program modules, and program data. Each of the operating system, one or more application programs, other program modules, and program data or some combination thereof, may include an implementation of a networking environment. Program modules (642) generally carry out the functions and/or methodologies of the embodiments as described herein.

Computer system/server (612) may also communicate with one or more external devices (614) such as a keyboard, a pointing device, a display (624), etc.; one or more devices that enable a user to interact with computer system/server (612); and/or any devices (e.g., network card, modem, etc.) that enable computer system/server (612) to communicate with one or more other computing devices. Such communication can occur via Input/Output (I/O) interfaces (622). Still yet, computer system/server (612) can communicate with one or more networks such as a local area network (LAN), a general wide area network (WAN), and/or a public network (e.g., the Internet) via network adapter (620). As depicted, network adapter (620) communicates with the other components of computer system/server (612) via bus (618). It should be understood that although not shown, other hardware and/or software components could be used in conjunction with computer system/server (612). Examples, include, but are not limited to: microcode, device drivers, redundant processing units, external disk drive arrays, RAID systems, tape drives, and data archival storage systems, etc.

Figure 7:
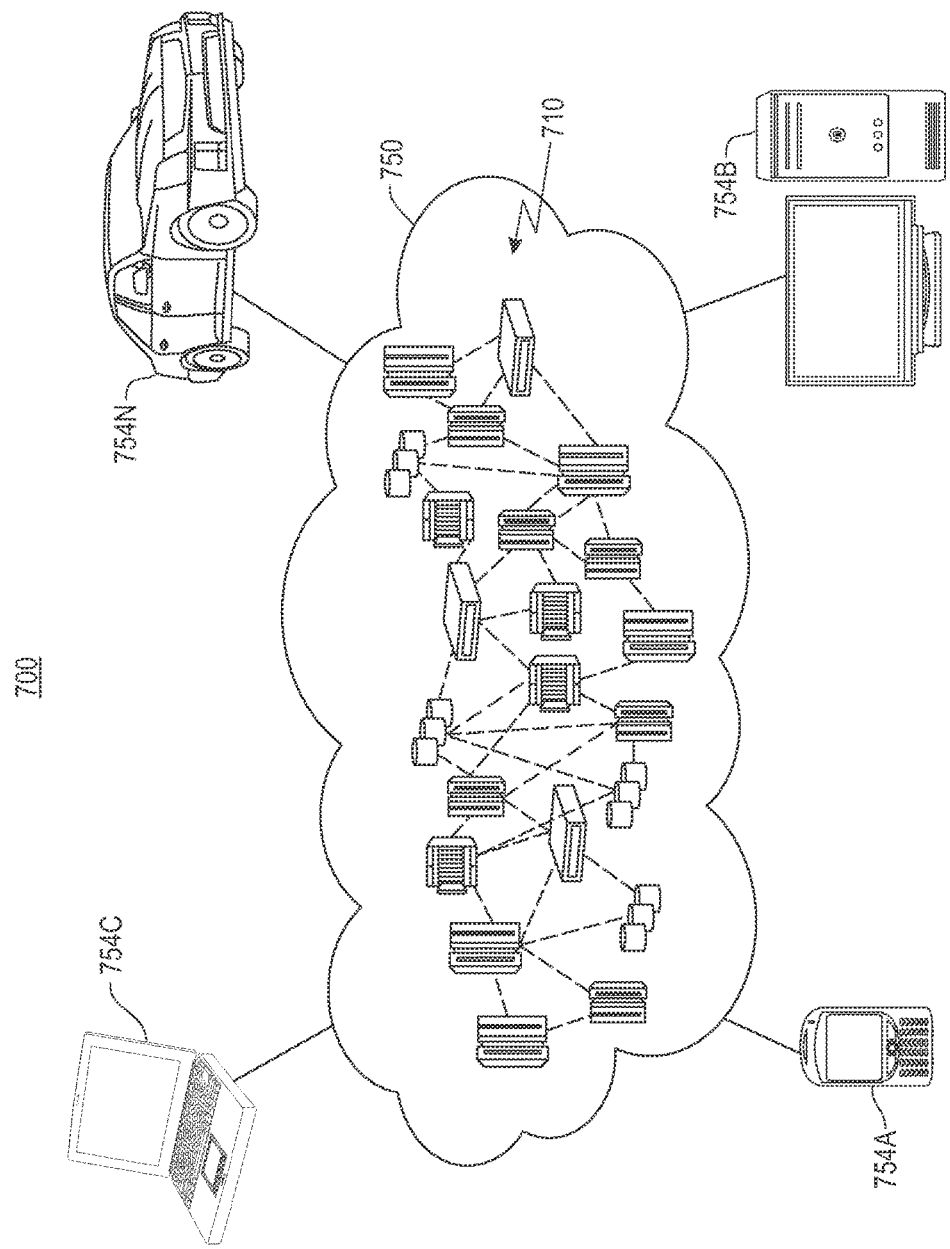
FIG. 7 depicts a block diagram illustrating a cloud computing environment, according to an embodiment.

Referring now to FIG. 7, illustrative cloud computing environment (700) is depicted. As shown, cloud computing environment (700) includes one or more cloud computing nodes (710) with which local computing devices used by cloud consumers may communicate. Examples of these local computing devices include, but are not limited to, personal digital assistant (PDA) or cellular telephone (720), desktop computer (730), laptop computer (740), and/or automobile computer system (750). Individual nodes within nodes (710) may further communicate with one another. They may be grouped (not shown) physically or virtually, in one or more networks, such as Private, Community, Public, or Hybrid clouds as described hereinabove, or a combination thereof. This allows cloud computing environment (700) to offer infrastructure, platforms and/or software as services for which a cloud consumer does not need to maintain resources on a local computing device. It is understood that the types of computing devices (720)-(750) shown in FIG. 7 are intended to be illustrative only and that computing nodes (710) and cloud computing environment (700) can communicate with any type of computerized device over any type of network and/or network addressable connection (e.g., using a web browser).

Figure 8:
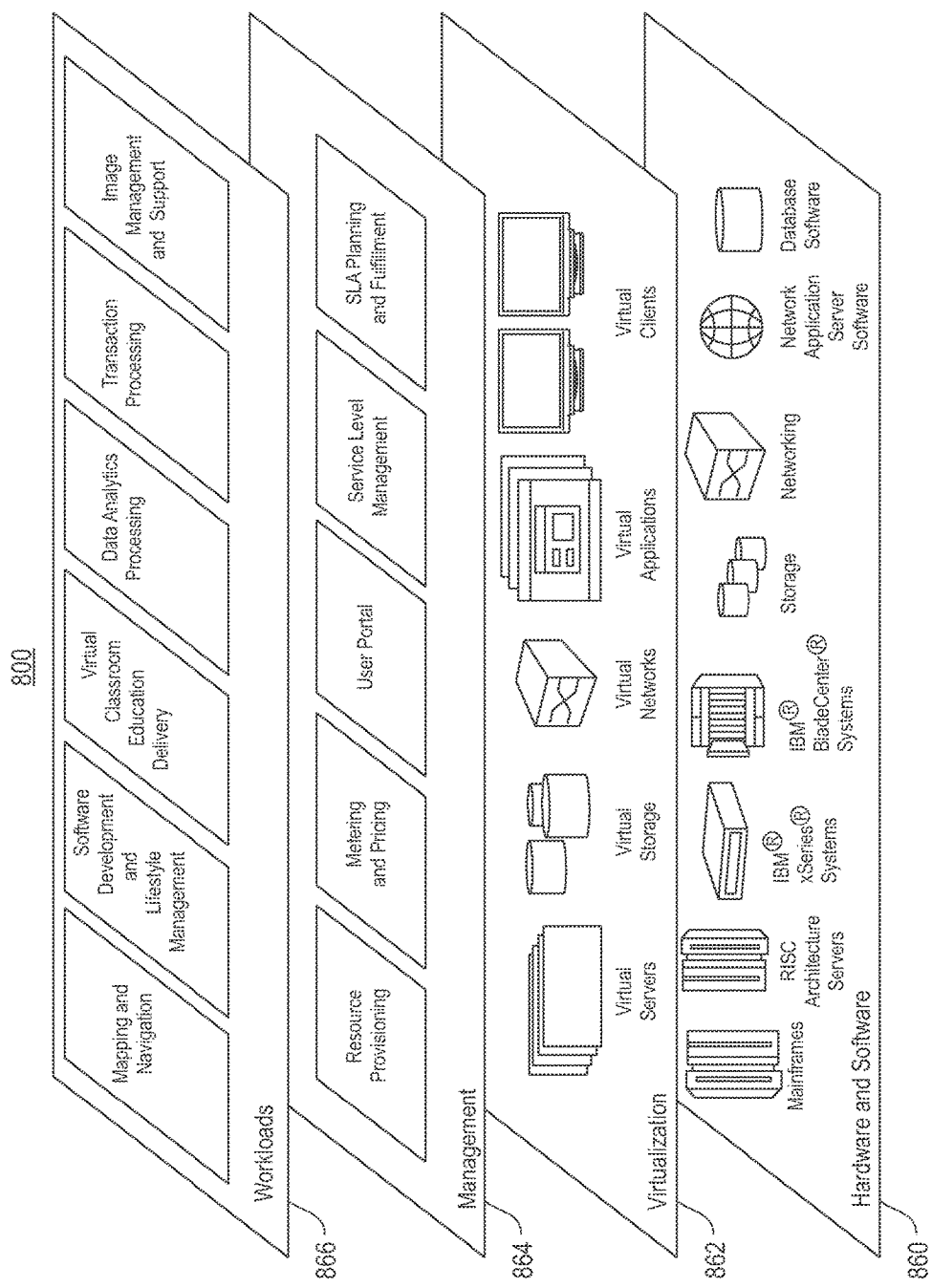
FIG. 8 depicts a block diagram illustrating a set of functional abstraction model layers provided by the cloud computing environment, according to an embodiment.

Referring now to FIG. 8, a set of functional abstraction layers provided by cloud computing environment (800) is shown. It should be understood in advance that the components, layers, and functions shown in FIG. 8 are intended to be illustrative only, and the embodiments are not limited thereto. As depicted, the following layers and corresponding functions are provided: hardware and software layer (810), virtualization layer (820), management layer (830), and workload layer (840). The hardware and software layer (810) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (820) provides an abstraction layer from which the following examples of virtual entities may be provided: virtual servers; virtual storage; virtual networks, including virtual private networks; virtual applications and operating systems; and virtual clients.

In one example, management layer (830) may provide the following functions: resource provisioning, metering and pricing, user portal, service level management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer (840) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and image stored, classification, and grouping support within the cloud computing environment.

In the shared pool of configurable computer resources described herein, hereinafter referred to as a cloud computing environment, files may be shared among users within multiple data centers, also referred to herein as data sites. A series of mechanisms are provided within the shared pool to provide decision making controls for access to one or more records based upon associated record access and inherent characteristics of privacy. Three knowledge bases are employed with respect to consent management, including importance, sensitivity, and relevance. Analytical techniques employ the knowledge bases to assist with making access control decisions. With respect to the image classification, management, and selection, image files may be stored on a data storage device of a shared resource, and the tools to support the classification, management, and selection of images files may similarly be stored on a shared resource. As such, the cloud based support enables a patron to access the image management system through the cloud. In one embodiment, the patron may access the image management system with image presentation and selection limited to image files in a folder assigned to a specific identifier. The patron mayo execute a transaction for obtaining the image files via the cloud, with transfer of an electronic file to a portal in communication with the cloud once the transaction has been completed. Accordingly, the shared resource implementation enables and supports transaction with the image management system.

As will be appreciated by one skilled in the art, the aspects may be embodied as a system, method, or computer program product. Accordingly, the aspects may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the aspects described herein may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for the embodiments described herein may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The embodiments are described above with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow chart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus, provide processes for implementing the functions/acts specified in the flow chart and/or block diagram block or blocks.

The flow charts and block diagrams in the Figures illustrate the architecture, functionality, and operation of possible implementations of systems, methods, and computer program products according to various embodiments. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustration(s), and combinations of blocks in the block diagrams and/or flow chart illustration(s), can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The embodiments described herein may be implemented in a system, a method, and/or a computer program product. The computer program product may include a computer readable storage medium (or media) having computer readable program instructions thereon for causing a processor to carry out the embodiments described herein.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmissions, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The embodiments are described herein with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

The corresponding structures, materials, acts, and equivalents of all means or step plus function elements in the claims below are intended to include any structure, material, or act for performing the function in combination with other claimed elements as specifically claimed. The description of the embodiments herein has been presented for purposes of illustration and description, but is not intended to be exhaustive or limited to the embodiments in the forms disclosed. Many modifications and variations will be apparent to those of ordinary skill in the art without departing from the scope and spirit of the embodiments described herein. The embodiments were chosen and described in order to best explain the principles and the practical application, and to enable others of ordinary skill in the art to understand the various embodiments with various modifications as are suited to the particular use contemplated. Accordingly, the implementation of image classification shown and described herein creates a primary image group that includes a generated primary image and a received secondary image assigned to the primary image group based on a relevance score of the secondary image.

It will be appreciated that, although specific embodiments have been described herein for purposes of illustration, various modifications may be made without departing from the spirit and scope of the specific embodiments described herein. Details of the embodiments have been described with respect to an entertainment venue, such as an amusement park. However, the processes and systems described herein may be employed in a variety of venues where images may be acquired.

For example, the processes and systems described herein may be employed in the context of providing security at a venue, such as a secured site. Such secured sites may include, but are not limited to, schools, university campuses, prisons, etc.

Each person authorized to be at the site may be required to go through an initial registration process. This initial registration process may include capturing a primary image of a registrant to the site. The primary image is then assigned to a profile corresponding to the registrant. In one embodiment, the registrant is given a device, such as a keycard or other form of identification, for use in an identity verification system. The device provides a link to the registrant's profile in the image database. If a person wishes to gain access to the site, the person has to utilize the device (e.g., swipe a keycard). In another embodiment, a secondary camera may be used to capture a secondary image of a person attempting to enter the site. The system may then compare the captured secondary image to the primary image database to determine if the person is authorized, and to grant or deny access to the person in response to the comparison.

A network of secondary cameras may be set up within the site itself to capture one or more secondary images of each person periodically while in the site. In one embodiment, the system may be configured to automatically generate a path corresponding to a person by correlating the periodically captured secondary images, and piecing them together to assemble a pattern. If the location of the person is considered to be erratic, or the pattern the person is traversing appears to be suspicious or otherwise irregular, the system may be configured to alert a system administrator. In one embodiment, the alert includes one or more of the secondary images of the suspect person. Furthermore, the system may compare the one or more secondary images of the suspect person with the primary image database to determine if the suspect person is authorized to be at the site. If it is determined that the suspect person has not registered into the system (i.e., is an intruder) based on the comparison, an intruder alert may be issued to the system administrator. In one embodiment, the system can assemble the path that the intruder has taken to determine where the intruder has traveled within the site. This may provide information regarding locations that were breached by the intruder.

As another example, the processes and systems described herein may be employed in the context of an automated storage system, such as with a storage unit. The owner(s) of the storage unit may be required to go through an initial registration process with the storage unit. The initial registration process may include capturing a primary image of each owner. The primary image is then assigned to profile(s) corresponding to the owner(s). In one embodiment, each owner is given a device, such as a keycard or other form of identification, for use in an identity verification system to access the storage unit. The device provides a link to the registrant's profile in the image database. If a person wishes to gain access to the site, the person has to utilize the device (e.g., swipe a keycard). In another embodiment, a secondary camera may be used to capture a secondary image of a person attempting to access the storage unit. The system may then compare the captured secondary image to the primary image database to determine if the person is an owner of the storage unit, and to grant or deny access to the person in response to the comparison.

Furthermore, storage unit contents may be monitored within the storage unit itself. In one embodiment, a primary image of each object is captured. One or more secondary cameras may be placed within the storage unit to periodically analyze the contents within the storage unit. This may allow the owner to determine the location of an object inside the storage unit, which can be especially useful in the context of large storage units (e.g., warehouses) that house many items. In one embodiment, the one or more secondary cameras may be configured to detect when an object is removed from the storage unit. In one embodiment, the automated storage system may automatically remove the image of the object from the image database in response to the removal. In another embodiment, the automated storage system may notify the owner that the object has been removed.

In yet another example, the processes and systems described herein may be employed in the context of a home automation system, which may include a home security system. Each family member may be required to go through an initial registration process. This initial registration process may include capturing a primary image of each respective family member. Additional people may also be registered, such as extended family, friends, etc. The primary image is then assigned to a profile corresponding to a respective person.

A network of secondary cameras may be set up within and around the home to periodically capture one or more secondary images. In one embodiment, the system may be configured to determine the presence of a potential intruder entering the house by comparing one or more captured secondary images to the primary image database. If the comparison determines that a captured secondary image does not match a primary image in the database, then an alert may be automatically issued (e.g., an alarm). In another embodiment, the system may be further configured for child safety purposes. For example, if a comparison of a captured secondary image to the primary image database indicates that a baby or other small child has left a designated area or entered a restricted area, either of which may be specified via a system interface, an alert may be issued to the family (e.g., via a mobile application, web interface, etc.). alert includes one or more of the secondary images of the suspect person. The home automation system may be configured for a variety of other purposes, such as in the context of smart home technology.

As discussed above, the processes and systems described herein may be employed in a variety of unique contexts and venues. These contexts include, but are not limited to, image capturing and storage, security systems (e.g., for secured sites), object identification and tracking systems, and localized automation systems. Accordingly, the scope of protection is only limited by the following claims and their equivalents.

We claim:

1. A method comprising:
    associating a first subject in a first image to a second subject in a second image in response to analyzing one or more first facial characteristics of the first subject against one or more second facial characteristics of the second subject, wherein the second image comprises the second subject and a third subject;
    receiving an indication from a first patron corresponding to the first subject that the first subject does not match the second subject; and
    in response to receiving the indication:
        disassociating the second subject from the first subject;
        associating the third subject to a fourth subject in a third image; and
        displaying the second image to a second patron corresponding to the third image.

2. The method of claim 1 wherein, in response to the associating of the first subject to the second subject, the method further comprises:
    adding the second image to a group file that comprises the first image; and
    linking the second image to the first image.

3. The method of claim 2 wherein, in response to the disassociating of the second subject from the first subject, the method further comprises:
    removing the second image from the group file; and
    unlinking the second image from the first image.

4. The method of claim 1 further comprising:
    determining that the second subject and the third subject comprise a group; and
    in response to the determination:
        identifying a plurality of fourth images that include both the second subject and the third subject; and
        adding the identified plurality of fourth images to a group file that comprises the third image.

5. The method of claim 1, further comprising detecting reoccurrence of one or more secondary characteristics of the second subject, and updating a correlation value associated with one or more reoccurring characteristics of the first subject.

6. The method of claim 5, further comprising assigning the second image to a first group corresponding to the first image in response to the correlation value exceeding a threshold.

7. A system comprising:
    one or more processors;
    a memory coupled to at least one of the processors;
    a set of computer program instructions stored in the memory and executed by at least one of the processors in order to perform actions of:
        associating a first subject in a first image to a second subject in a second image in response to analyzing one or more first facial characteristics of the first subject against one or more second facial characteristics of the second subject, wherein the second image comprises the second subject and a third subject;
        receiving an indication from a first patron corresponding to the first subject that the first subject does not match the second subject; and
        in response to receiving the indication:
            disassociating the second subject from the first subject;
            associating the third subject to a fourth subject in a third image; and
            displaying the second image to a second patron corresponding to the third image.

8. The system of claim 7 wherein at least one of the one or more processors perform additional actions comprising:
    in response to the associating of the first subject to the second subject:
        adding the second image to a group file that comprises the first image; and
        linking the second image to the first image; and
    in response to the disassociating of the second subject from the first subject:
        removing the second image from the group file; and
        unlinking the second image from the first image.

9. The system of claim 7 wherein at least one of the one or more processors perform additional actions comprising:
    determining that the second subject and the third subject comprise a group; and
    in response to the determination:
        identifying a plurality of fourth images that include both the second subject and the third subject; and
        adding the identified plurality of fourth images to a group file that comprises the third image.

10. The system of claim 7 wherein at least one of the one or more processors perform additional actions comprising:
    detecting reoccurrence of the or more secondary characteristics of the second subject and to update a correlation value associated with one or more reoccurring characteristics of the first subject.

11. The system of claim 10 wherein at least one of the one or more processors perform additional actions comprising:
    assigning the second image to a group in response to the correlation value in excess of a threshold.

12. A computer program product comprising a non-transitory computer readable storage medium having program code embodied therewith, the program code executable by a processing unit to:
- associate a first subject in a first image to a second subject in a second image in response to analyzing one or more first facial characteristics of the first subject against one or more second facial characteristics of the second subject, wherein the second image comprises the second subject and a third subject;
- receive an indication from a first patron corresponding to the first subject that the first subject does not match the second subject; and
- in response to receiving the indication:
  - disassociate the second subject from the first subject;
  - associate the third subject to a fourth subject in a third image; and
  - display the second image to a second patron corresponding to the third image.

13. The computer program product of claim 12 wherein, in response to the associating of the first subject to the second subject, the program code further executable by the processing unit to:
- add the second image to a group file that comprises the first image; and
- link the second image to the first image.

14. The computer program product of claim 13 wherein, in response to the disassociating of the second subject from the first subject, the program code further executable by the processing unit to:
- remove the second image from the group file; and
- unlink the second image from the first image.

15. The computer program product of claim 13 wherein the program code is further executable by the processing unit to:
- determine that the second subject and the third subject comprise a group; and
- in response to the determination:
  - identify a plurality of fourth images that include both the second subject and the third subject; and
  - add the identified plurality of fourth images to a group file that comprises the third image.

16. The computer program product of claim 12, further comprising program code to detect reoccurrence of one or more secondary characteristics of the second subject, and update a correlation value associated with one or more reoccurring characteristics of the first subject.

17. The computer program product of claim 16, further comprising program code to assign the second image to a first group corresponding to the first image in response to the correlation value exceeding a threshold.

* * * * *